US010647267B2

(12) United States Patent
Briggs et al.

(10) Patent No.: US 10,647,267 B2
(45) Date of Patent: May 12, 2020

(54) VEHICLE BED LINER AND CARGO MANAGEMENT SYSTEM

(71) Applicants: Jeffrey Mark Briggs, Madison, CT (US); Jonathan Erik Mossberg, Ormond Beach, FL (US)

(72) Inventors: Jeffrey Mark Briggs, Madison, CT (US); Jonathan Erik Mossberg, Ormond Beach, FL (US)

(*) Notice: Subject to any disclaimer, the term of this patent is extended or adjusted under 35 U.S.C. 154(b) by 77 days.

(21) Appl. No.: 16/128,504

(22) Filed: Sep. 11, 2018

(65) Prior Publication Data

US 2019/0106063 A1     Apr. 11, 2019

Related U.S. Application Data

(60) Provisional application No. 62/556,620, filed on Sep. 11, 2017.

(51) Int. Cl.
*B60R 13/01* (2006.01)
*B60P 7/08* (2006.01)

(52) U.S. Cl.
CPC ............ *B60R 13/01* (2013.01); *B60P 7/0807* (2013.01); *B60R 2013/018* (2013.01)

(58) Field of Classification Search
CPC ... B60R 13/01; B60R 2013/018; B60P 7/0807
See application file for complete search history.

(56) References Cited

U.S. PATENT DOCUMENTS

| 2,574,483 | A |   | 11/1951 | Jack |   |
|---|---|---|---|---|---|
| 2,733,671 | A |   | 2/1956 | Sheesley et al. |   |
| 2,898,146 | A |   | 8/1959 | Yudenfreund |   |
| 4,000,870 | A | * | 1/1977 | Davies | B64C 1/20 410/92 |
| 4,278,376 | A | * | 7/1981 | Hunter | B60P 7/14 410/104 |
| 4,890,874 | A |   | 1/1990 | Davis |   |

(Continued)

FOREIGN PATENT DOCUMENTS

| GB | 2118109 A | 10/1983 |
|---|---|---|
| JP | 2017-523075 | 8/2017 |

(Continued)

*Primary Examiner* — Lori L Lyjak
(74) *Attorney, Agent, or Firm* — Thomas P. O'Connell; O'Connell Law Firm

(57) ABSTRACT

A cargo bed liner for protecting a cargo bed of a vehicle. Plural rigid floor panels are interconnected to form a cargo liner platform suspended above the cargo bed by suspension rails to disperse impacts and otherwise to protect the cargo bed. The floor panels are interlocked by tabs projecting from at least some of the panels. The floor panels are fixed to the suspension rails by locking slots in combination with locking studs. The suspension rails are fixed to the cargo bed in retention of the cargo liner platform. Anchors with extendable and retractable clamping members and registration members are selectively retained relative to apertures of an array of paired apertures in the platform for permitting secure and adjustable retention and transport of cargo. The clamping and registration members have outer surfaces separated by a distance less than a longitudinal dimension of apertures within the array of apertures.

35 Claims, 9 Drawing Sheets

(56) References Cited

U.S. PATENT DOCUMENTS

| | | | |
|---|---|---|---|
| 4,990,049 A | 2/1991 | Hargrove | |
| 4,993,088 A * | 2/1991 | Chudik | A47C 17/80 |
| | | | 108/44 |
| 5,584,524 A | 12/1996 | Vogel | |
| 5,597,193 A | 1/1997 | Conner | |
| 5,795,006 A | 8/1998 | Beckstrom | |
| 6,017,074 A | 1/2000 | Biskup | |
| 6,068,324 A * | 5/2000 | DeKlotz | B60J 5/108 |
| | | | 296/10 |
| 6,089,803 A | 7/2000 | Holland | |
| 6,120,078 A | 12/2000 | Smyl | |
| 6,176,541 B1 | 1/2001 | Hoff | |
| 6,283,527 B1 | 9/2001 | Desmarais | |
| 6,312,034 B1 * | 11/2001 | Coleman, II | B60P 1/003 |
| | | | 296/26.09 |
| 6,530,730 B2 | 3/2003 | Swensen | |
| 7,703,826 B1 * | 4/2010 | German | B60R 13/01 |
| | | | 296/37.6 |
| 8,011,692 B2 | 9/2011 | Friesen | |
| 8,033,776 B2 | 10/2011 | Calhoun | |
| 8,430,441 B2 | 4/2013 | Waterman | |
| 8,567,840 B2 | 10/2013 | Mirabella et al. | |
| 8,840,166 B1 | 9/2014 | Derbes et al. | |
| 9,376,048 B2 | 6/2016 | Evans | |
| 2002/0098071 A1 | 7/2002 | Henderson | |
| 2002/0140245 A1 * | 10/2002 | Coleman, II | B60P 1/003 |
| | | | 296/26.09 |
| 2002/0149223 A1 | 10/2002 | Saucier et al. | |
| 2003/0057724 A1 * | 3/2003 | Inagaki | B60N 2/3013 |
| | | | 296/37.8 |
| 2006/0033353 A1 | 2/2006 | Bequette | |
| 2008/0084083 A1 * | 4/2008 | Boddie | B60R 11/00 |
| | | | 296/39.1 |
| 2009/0212584 A1 | 8/2009 | Hill | |
| 2010/0327616 A1 | 12/2010 | Calhoun | |
| 2012/0161470 A1 | 6/2012 | Castillo | |
| 2014/0308103 A1 * | 10/2014 | Pike | B60P 1/64 |
| | | | 414/522 |
| 2015/0061311 A1 | 3/2015 | Natarajan et al. | |

FOREIGN PATENT DOCUMENTS

| | | |
|---|---|---|
| WO | WO2015/099544 A1 | 7/2015 |
| WO | WO2016/162393 | 10/2016 |

* cited by examiner

VEHICLE BED LINER AND CARGO MANAGEMENT SYSTEM

RELATED APPLICATION

This application claims the benefit of U.S. Provisional Patent Application No. 62/556,620, filed Sep. 11, 2017, which is incorporated herein by reference.

FIELD OF THE INVENTION

The present invention relates generally to structures for protecting the cargo beds of vehicles. More particularly, disclosed herein is a vehicle cargo bed liner with a plurality of floor panels interconnected to form a support structure suspended above the cargo bed of the vehicle thereby to protect the cargo bed against damage from impacts, abrasions, and the elements. An array of apertures in the interconnected floor panels in combination with cargo retention anchors facilitate stable and secure cargo retention and management.

BACKGROUND OF THE INVENTION

The need for protecting the cargo beds of pickups, delivery trucks, vans, and other vehicles from impacts, abrasions, and other damage has been long recognized. Indeed, since the advent of trucks with cargo beds, proposals have existed for attempting to protect truck beds from the wear and tear inherent in the truck's capacity as a service vehicle. Rudimentary solutions have been proposed, such as lining the cargo bed with strips or sheets of wood. In later years, unitary or multi-component polymeric liners were provided and were often specially configured for particular cargo bed shapes. Still further, spray-on cargo bed liners have been taught wherein a thick and durable coating is sprayed directly onto the surfaces of the cargo bed.

While the foregoing methods advantageously provide some level of protection, each suffers from known disadvantages. For instance, ad hoc wood liners often lack a finished, professional appearance and are highly vulnerable to damage. Pre-formed polymeric liners must typically be individually designed and formed for each distinct cargo bed shape, and such liners are markedly difficult to transport and store and are prone to cracking and warping. Spray-on cargo bed liners can develop rips, punctures, or tears or can bubble or fade thereby necessitating removal, which is difficult in view of the liner being directly affixed to the cargo bed itself. Moreover, spray-on liners provide minimal impact protection and, as competitive advertising has recently shown, readily transmit impacts and damage directly to the cargo bed itself. Neither the foregoing nor any other known truck bed liner provides a significant impact barrier to the factory cargo bed. Furthermore, prior art cargo bed liners often produce their own deleterious effects on the cargo bed, such as by ongoing abrasion and fastening and adhesion requirements.

Beyond the foregoing, cargo bed liners of the prior art typically lack sufficient attachment locations to permit versatile and effective tie-down operations. To the extent tie-down locations are accessible at all, they are often quite limited and in fixed locations not necessarily convenient, effective, or sufficiently versatile for restraining particular articles of cargo and multiple, varied items simultaneously. Moreover, with many known cargo bed liners, tie-down mechanisms are not available over the surface of the floor of the cargo bed itself where the greatest hold-down strength is often required. Indeed, spray-on coatings and drop-in synthetic bed liners simply do not allow for a large variety of tie-down options to the bed of the cargo area. Most offer no tie-down options to the cargo bed whatsoever.

Factory-provided tie-down apertures and other securing mechanisms are commonly elevated from the floor of the cargo bed to a height that prevents the application of a securing force in a vertically downward direction from a location at or near the surface of the cargo bed. With that, adequate load retention is compromised, particularly in relation to cargo that has a height below or marginally above the height of the factory-provided securing mechanisms.

It is, therefore, apparent that there remains a need in the art for a liner structure for the cargo beds of vehicles that can effectively protect the cargo bed from impact and abrasion damage while enabling stable and secure cargo retention in a readily adaptable and convenient manner.

SUMMARY OF THE INVENTION

With a knowledge of the foregoing, the present invention is founded on the basic objects of providing a cargo bed liner that offers durable protection to the vehicle cargo bed while enabling convenient and effective load retention.

In certain embodiments of the cargo bed liner, an object of the invention is to provide a protective structural platform that is suspended above the vehicle cargo bed to permit, among other things, a dissipation and distribution of shock and impact forces incident on the cargo bed liner.

An underlying object of the invention is to provide a cargo bed liner that guards against impact, weather, and abrasion damage to the cargo bed, including during cargo loading, unloading, and transport and daily vehicle usage.

A related object of the invention is to provide a cargo bed liner that minimizes abrasion damage deriving from contact between the cargo bed and the bed liner itself.

A further related object of the invention, in particular embodiments, is to provide a cargo bed liner with components formed of rigid, structural material to resist impact damage.

Another object of the invention is to provide a cargo bed liner that preserves the value of the subject vehicle by protecting the cargo bed thereof.

A further object of the embodiments of the invention is to provide a cargo bed liner that can be readily removed and replaced as for maintenance and cleaning.

In certain manifestations of the invention, a further object is to provide a cargo bed liner that facilitates the stable and secure retention of cargo in a versatile and convenient manner.

These and further objects, advantages, and details of the present invention will become obvious not only to one who reviews the present specification and drawings but also to those who have an opportunity to make use of a cargo bed liner as disclosed herein. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth one or more of the foregoing objects, one embodiment of the cargo bed liner disclosed herein has a cargo liner platform formed by at least one rigid floor panel with an upper surface, a lower surface, an anterior edge, a posterior edge, and left and right side edges. At least one suspension rail is provided for being longitudinally disposed within the cargo bed of the vehicle to retain and suspend the at least one rigid floor panel above the cargo bed of the vehicle with a gap between the at least one rigid floor panel and the cargo bed. For instance, where the cargo bed has longitudinal ridges separated by longitudinal furrows, the at least one rail can have a height greater than the height of the longitudinal ridges. Under this construction, the cargo liner platform is suspended above the cargo bed, and impacts on the at least one rigid floor panel tend to be dispersed over the at least one rigid floor panel.

In practices of the invention, the cargo liner platform can be formed by plural rigid floor panels for being disposed in substantially coplanar juxtaposition to form the cargo liner platform. Moreover, there can be at least two suspension rails for being disposed in a parallel, longitudinally disposed relationship within the cargo bed of the vehicle.

Embodiments of the cargo bed liner can have at least one interlocking tab that projects beyond at least one of the anterior edge and the posterior edge of one or more of the rigid floor panels. For example, there can be at least three rigid floor panels, and a middle panel of the at least three rigid floor panels can have plural interlocking tabs that project from the anterior edge of the panel and plural interlocking tabs that project from the posterior edge of the panel. Still more particularly, there could be at least five rigid floor panels with at least one rigid floor panel having plural interlocking tabs that project from at least one of the anterior and posterior edges of the panel, at least one rigid floor panel with plural locking studs that project from the lower surface thereof, and at least one rigid floor panel for being affixed to the suspension rails by mechanical fasteners. The suspension rails can be fastened to the cargo bed so that the rigid floor panels are interengaged relative to one another and securely retained relative to the cargo bed.

It is further contemplated that at least one of the rigid floor panels can have plural locking slots or plural locking studs while the at least one rail has plural locking studs or plural locking slots disposed to engage the plural locking slots or plural locking studs. In such embodiments, the plural locking slots may be keyhole-shaped locking slots.

Manifestations of the cargo bed liner can have a cargo liner platform formed by at least one rigid floor panel with at least one aperture in the at least one rigid floor panel. The at least one aperture can be considered to have a longitudinal dimension and a lateral dimension. Further, the longitudinal dimension of the at least one aperture can be greater than the lateral dimension of the at least one aperture. The longitudinal dimension of the at least one aperture may or may not be aligned with the longitudinal of the cargo bed. An anchor can be selectively retained relative to the at least one aperture. For example, the anchor can have a body portion, a clamping member that is extendable and retractable relative to the body portion, and a registration member retained by the body portion spaced from the clamping member. The registration member could also be extendable and retractable relative to the body portion. Under such constructions, the clamping member and the registration member can be inserted into and retained relative to a given aperture or potentially across plural apertures.

In particular embodiments of the cargo bed liner, the clamping member and the registration member have outer surfaces separated by a distance less than the longitudinal dimension of the at least one aperture. By way of example, the clamping member and the registration member can have outer surfaces separated by a distance that is at least approximately eighty percent of the the longitudinal dimension of the at least one aperture.

Embodiments of the clamping member are disclosed wherein the clamping member has a longitudinal portion and a lateral portion, and the lateral portion is retained to project away from the registration member. It is further taught that the longitudinal portion of the clamping member can be threaded, and a threaded member can be threadedly engaged with the longitudinal portion. With that, the lateral portion and the clamping member in general can be selectively retracted by rotation of the threaded member. Even further, the longitudinal portion of the clamping member can be keyed in relation to the body portion to prevent rotation of the clamping member relative to the body portion.

Furthermore, a lateral slot can be provided in the body portion of the anchor to permit, for example, the retention of a structural member in relation to the cargo liner platform. Additionally, it is disclosed that at least a portion of the body portion of the anchor can be pivotable in relation to at least one of the clamping member and the registration member. With that, the orientation of the body portion can be adjusted, such as to change the orientation of the lateral slot or otherwise to adjust the anchor.

One will appreciate that the foregoing discussion broadly outlines the more important goals and features of the invention to enable a better understanding of the detailed description that follows and to instill a better appreciation of the inventors' contribution to the art. Before any particular embodiment or aspect thereof is explained in detail, it must be made clear that the following details of construction and illustrations of inventive concepts are mere examples of the many possible manifestations of the invention.

DETAILED DESCRIPTION OF PREFERRED EMBODIMENTS

The vehicle bed liner and cargo management system disclosed herein is subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

Figure 1:
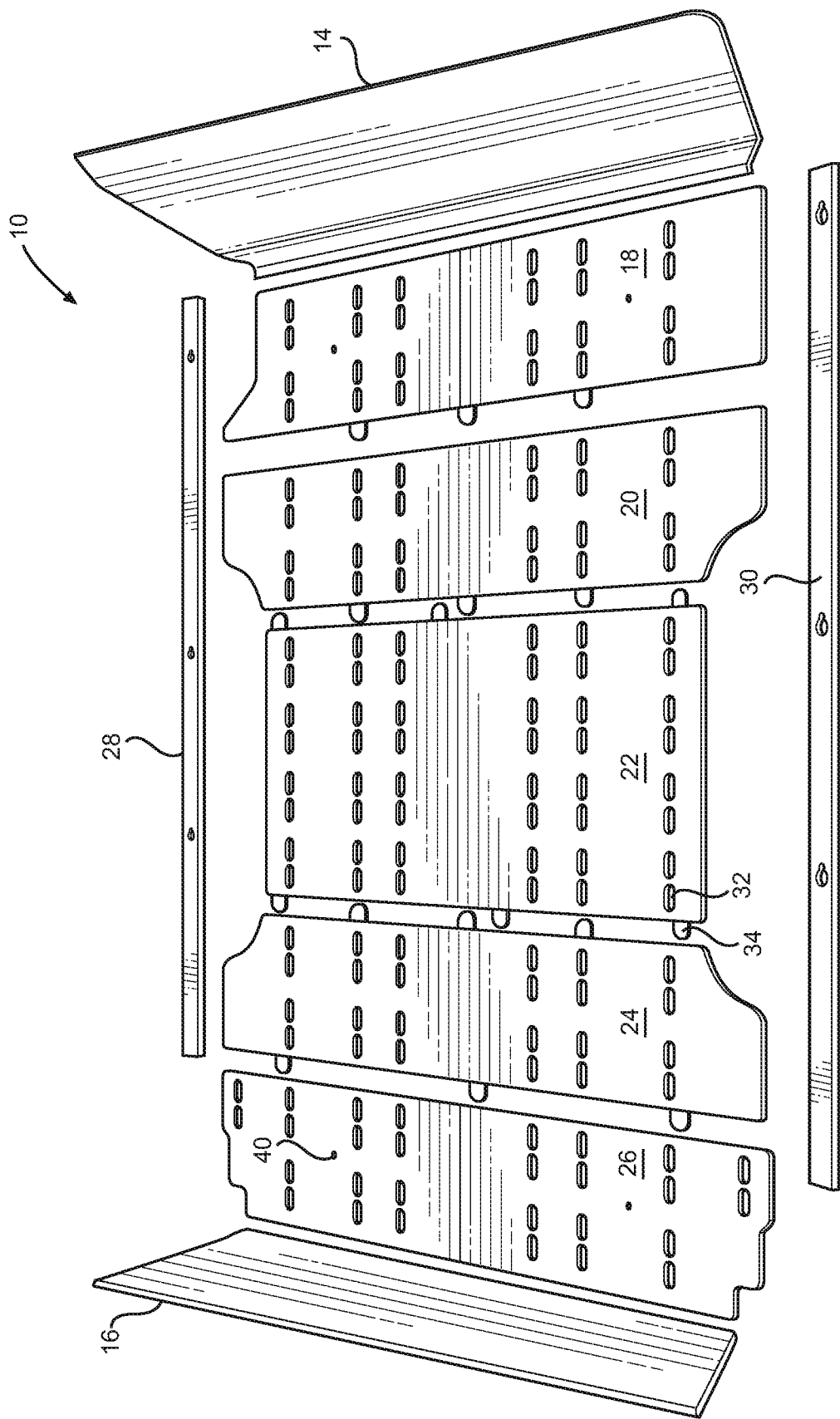
FIG. 1 is an upper perspective view of a cargo bed liner according to the invention prior to assembly.

Turning more particularly to the drawings, a cargo bed liner according to the invention is indicated generally at 10 in FIG. 1. There, the cargo bed liner 10 is founded on an interlocking floor lining structure 12 operative to provide durable protection to the floor of a cargo bed of a vehicle from impacts and abrasion while enabling varied cargo loads to be retained in a secure and stable manner. The depicted embodiment of the cargo bed liner 10 further incorporates a front wall panel 14 for being mounted to the anterior wall of a cargo bed and a tailgate panel 16 for being mounted to a tailgate of a cargo bed.

Figure 2:
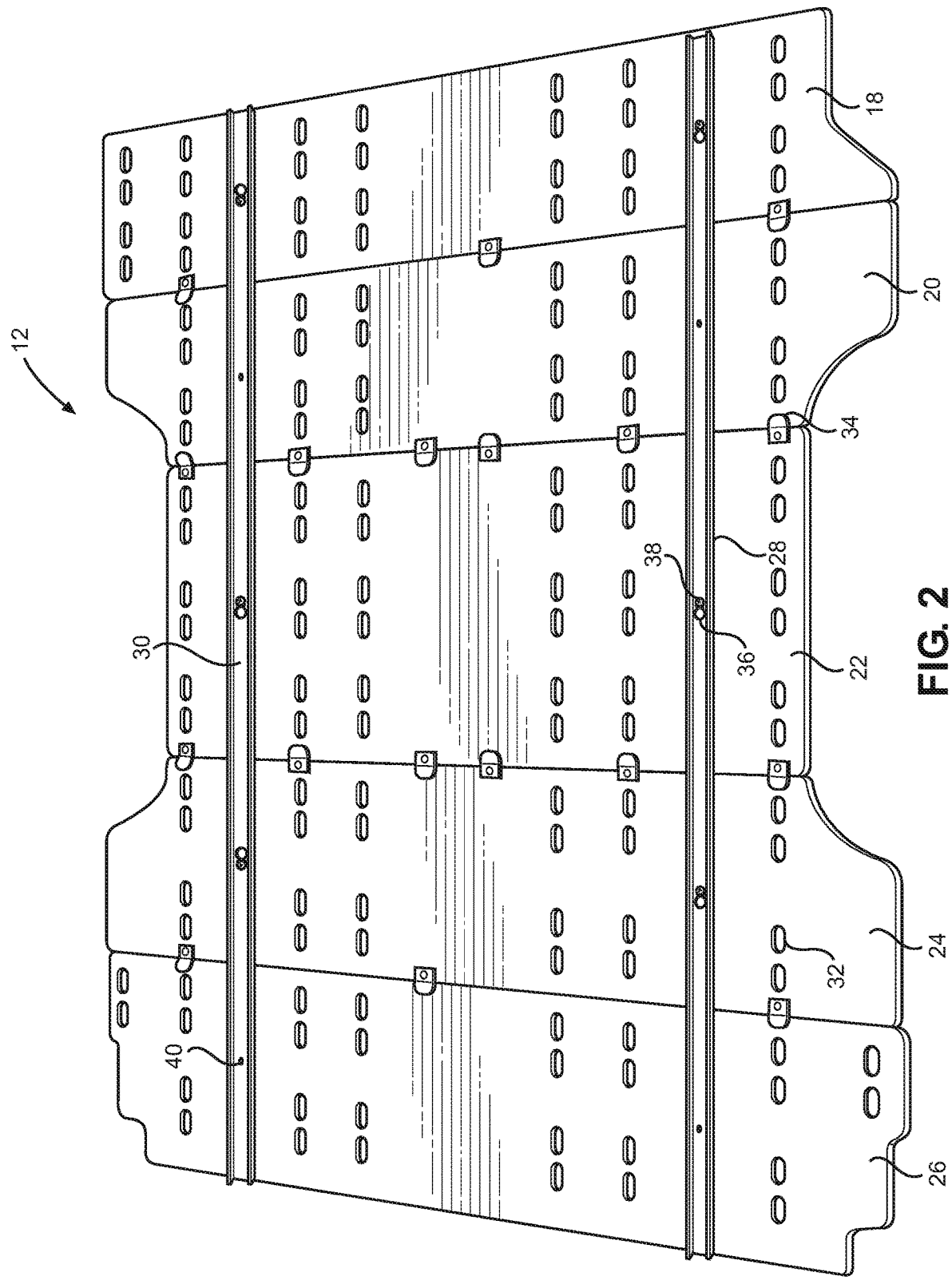
FIG. 2 is a lower perspective view of the floor panels of the cargo bed liner interengaged and retained by the cargo bed liner rails.

With combined reference to FIGS. 1 and 2, the floor lining structure 12 can be seen to be formed by plural interlocking panels that are mutually engaged and retained relative to one another and relative to corrugations in the floor of the cargo bed that traverse longitudinally along the cargo bed and in relation to the plural interlocking panels. In the depicted example, there are first, second, third, fourth, and fifth interlocking panels 18, 20, 22, 24, and 26 with it being understood that fewer or additional panels could be provided within the scope of the invention except as the claims might specify. The interlocking panels 18, 20, 22, 24, and 26 are rigid. By way of example and not limitation, the interlocking panels 18 through 26 could be formed from powder-coated steel, a rigid polymeric material, or some other rigid material or combination or layering of materials.

Figure 5:
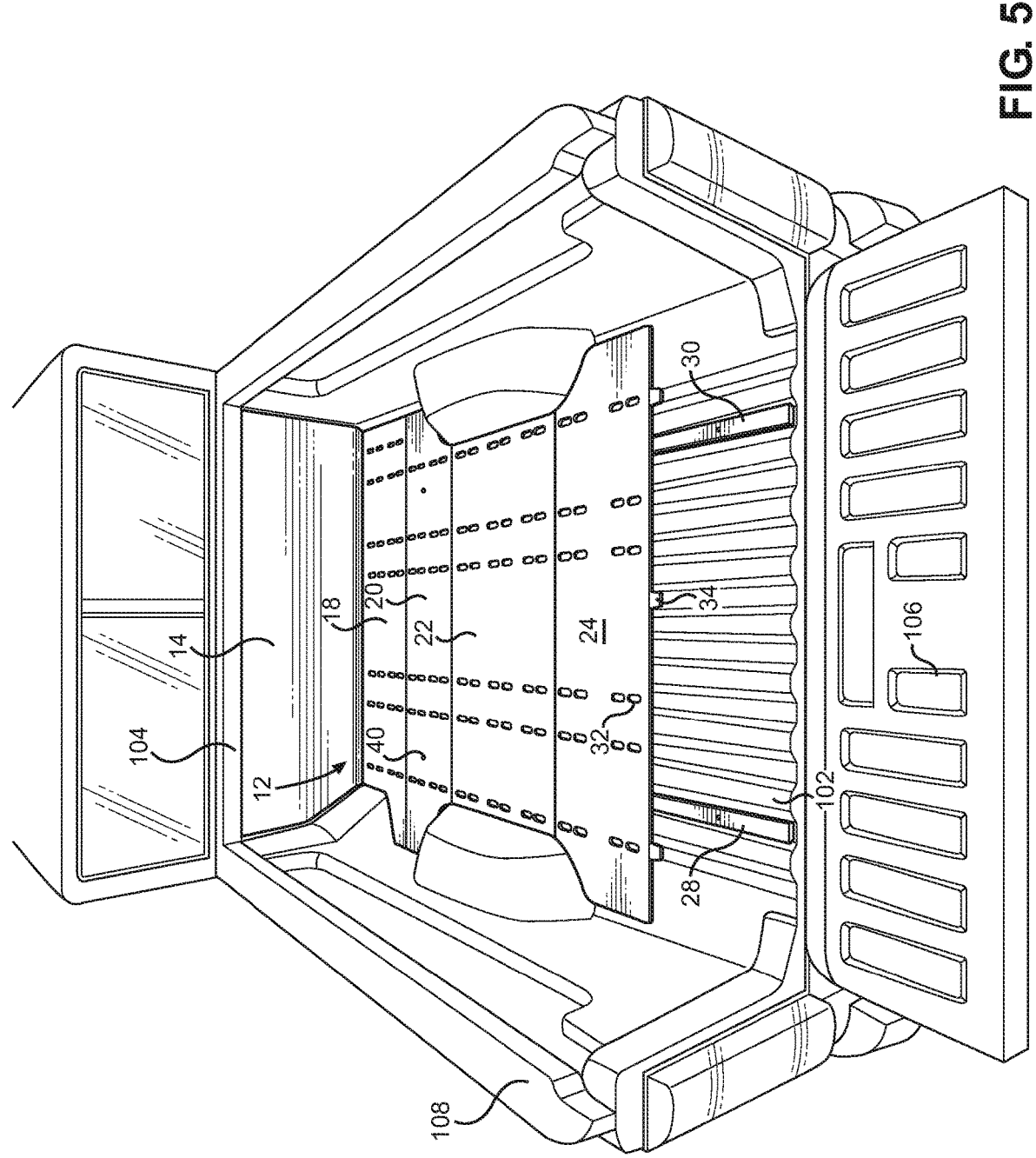
FIG. 5 is a perspective view of the front wall panel and first through fourth floor panels applied to the cargo bed with rails in a stage of installation of the cargo bed liner.

With additional reference to FIG. 5, of the interlocking panels 18, 20, 22, 24, and 26 can be considered to have an upper surface, a lower surface, a first or anterior edge for being disposed anteriorly and toward the front wall 104 of the cargo bed 100, a second or posterior edge for being disposed posteriorly and toward the tailgate 106 of the cargo bed 100, and left and right edges for being disposed in juxtaposition with corresponding portions of the left and right sidewalls 108 of the cargo bed 100. The facing anterior and posterior edges of adjacent interlocking panels 18 through 26 have matching peripheral shapes, and the left and right edges have contoured shapes designed to match the contour of the corresponding portion of the respective sidewall 108 of the cargo bed 100. In the depicted embodiment, the anterior and posterior edges of the interlocking panels 18, 20, 22, 24, and 26 are straight. However, non-rectilinear edge shapes are within the scope of the invention except as it might be expressly limited by the claims.

Figure 6:
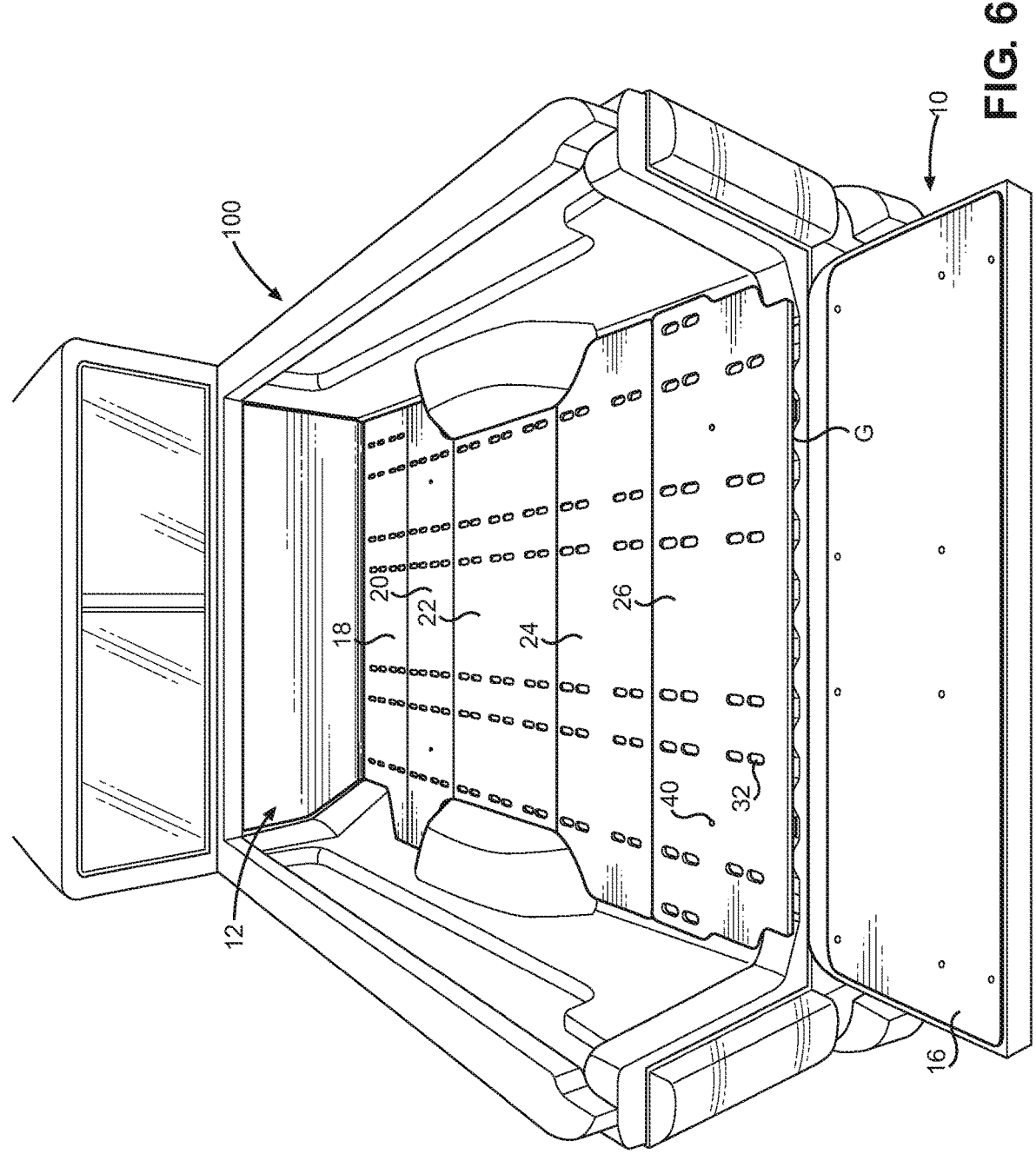
FIG. 6 is a perspective view of the front wall, tailgate, and floor panels applied to the cargo bed with rails during a stage of installation of the cargo bed liner.

When the interlocking panels 18, 20, 22, 24, and 26 are disposed in immediate juxtaposition with their respective edges aligned as in FIG. 2, for instance, they establish a rigid, unified platform. The unified platform formed by the interlocking panels 18, 20, 22, 24, and 26 can, in practices of the invention, have a peripheral shape corresponding to the shape of the floor of a given cargo bed 100 as is further illustrated in FIGS. 5 and 6, potentially with a marginally lesser size to permit ready fitting of the floor lining structure 12 within the cargo bed 100. In the depiction of FIGS. 5 and 6, the cargo bed 100 is that of a pickup truck, but it will be understood that the cargo bed liner 10 could be employed in relation to a wide variety of other vehicles, including but not limited to cargo and utility vans, delivery trucks, and other motorized and non-motorized vehicles.

The interlocking panels 18, 20, 22, and 24 have rigid interlocking tabs 34 that project from the posterior and, additionally or alternatively, the anterior edges thereof for assisting in interlocking the panels 18, 20, 22, 24, and 26 to form a structurally unified platform for protecting a floor 102 of a cargo bed 100 of a vehicle as, for instance, in FIGS. 5 and 6. More particularly, in this example of the interlocking floor lining structure 12, the first panel 18, which forms the most anterior of the floor panels 18 through 26, has plural rigid tabs 34 that project posteriorly from the lower surface of the first panel 18 beyond the posterior edge thereof. The second panel 20, which is disposed immediately adjacent to the first panel 18, similarly has rigid tabs 34 that project posteriorly from the lower surface of the second panel 20 beyond the posterior edge thereof. Each of the third and fourth panels 22 and 24, which are disposed in series with the first and second panels 18 and 20 when the floor lining structure 12 is assembled as in FIG. 2, has plural rigid tabs 34 that project from the lower surface thereof beyond the anterior edge and plural rigid tabs 34 that project from the lower surface thereof beyond the posterior edge. The fifth panel 26 in this example does not have tabs extending therefrom.

In the illustrated example, three tabs 34 project in each anterior or posterior direction where provided. It will again be understood that fewer or additional tabs 34 could readily be employed. The rigid tabs 34 are fixed in relation to the respective interlocking panels 18, 20, 22, and 24. For instance, the tabs 34 can be fixed in place by mechanical fasteners, by welding, or by any other effective method or combination thereof.

Figure 3:
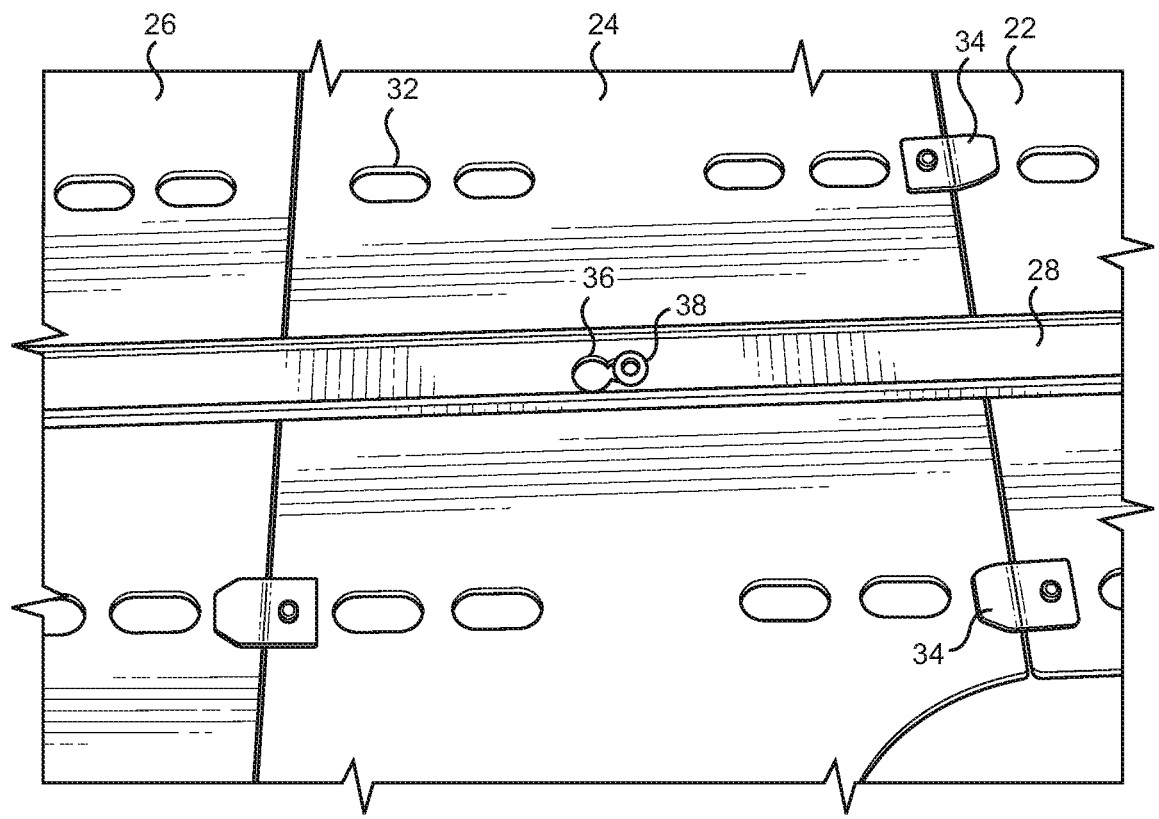
FIG. 3 is an amplified lower perspective view depicting the interengagement of the floor panels and the retention of the panels by the cargo bed liner rails.
Figure 4:
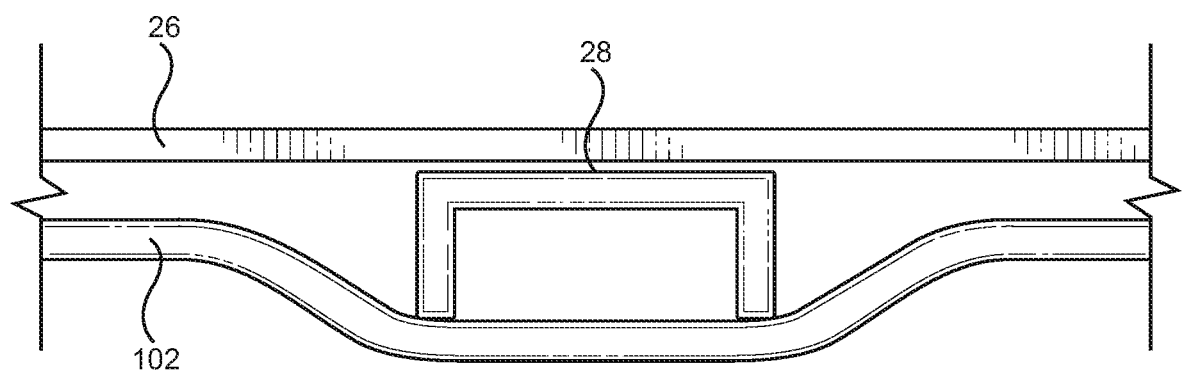
FIG. 4 is a further amplified elevational view of a portion of the cargo bed liner depicting the retention of a floor panel by a cargo bed liner rail.

The interlocking floor lining structure 12 of the cargo bed liner 10 additionally includes plural rails 28 and 30 that are disposed to communicate longitudinally in relation to the cargo bed 100 over the length thereof to span from adjacent to the anterior edge of the first floor panel 18 to adjacent to the posterior edge of the final floor panel 26. In the depicted embodiment, first and second rails 28 and 30 are employed, although it will be understood that further rails could be provided. Here, each rail 28 and 30 has a C-shaped lateral cross section as FIGS. 3 and 4 show perhaps most clearly. The rails 28 and 30 thus have a flat spine and first and second legs that project from the spine. In installation of the interlocking floor lining structure 12, the interlocking panels 18, 20, 22, 24, and 26 are fixed in relation to the rails 28 and 30, and the rails 28 and 30 are fixed in relation to floor 102 of the cargo bed 100 thereby fixing the rigid platform formed by the interlocking panels 18, 20, 22, 24, and 26 in place relative to the floor 102 of the cargo bed 100. The affixation of the interlocking panels 18, 20, 22, 24, and 26 directly to the floor 102 of the cargo bed 100 is not excluded.

In the present embodiment, in addition to the interengagement provided by the interlocking tabs 34, certain of the interlocking panels 18, 20, 22, 24, and 26 are fixed to the rails 28 and 30 and in relation to adjacent panels 18, 20, 22, 24, or 26 by mechanical fasteners driven through the respective panel 18, 20, 22, 24, or 26 and into the rails 28 and 30. Further, certain of the interlocking panels 18, 20, 22, 24, and 26 are fixed to the rails 28 and 30 and in relation to adjacent panels 18, 20, 22, 24, or 26 by key-shaped apertures 36 disposed in the respective panels 18, 20, 22, 24, or 26 on in the rails 28 and 30 in combination with locking studs 38 that project from the other of the rails 28 and 30 and the panels 18, 20, 22, 24, or 26. More particularly in the current manifestation of the invention, the first, third, and fourth floor panels 18, 22, and 24 have locking studs 38 that project from the lower surface thereof, and the rails 28 and 30 have correspondingly located key-shaped apertures 36 disposed therein for selectively receiving the locking studs 38. When the locking studs 38 are inserted through annular portions of the key-shaped apertures 36 and slid into place within slot portions of the key-shaped apertures 36, the respective panel 18, 22, or 24 is locked in place relative to the studs 38 and the rails 28 and 30.

Under the foregoing construction and with particular reference to FIGS. 5 and 6, installation of the cargo bed liner 10 in relation to a cargo bed 100 of a vehicle can include an affixation of the front wall panel 14 to the front wall 104 of the cargo bed 100 and an affixation of the tailgate panel 16 to the tailgate 106, such as by sheet metal screws or other mechanical fasteners, welding, or any other effective method or combination thereof. The first and second rails 28 and 30 are affixed, such as by mechanical fasteners, welding, or any other effective method, to the cargo bed 100 communicating longitudinally in relation to the cargo bed 100 and with the spines of the rails 28 and 30 facing upwardly as in FIG. 5. Where the floor 102 of the cargo bed 100 has longitudinal ridges and interposed longitudinal furrows as is the case with typical cargo beds 100 of pickup trucks, delivery vehicles, and other vehicles, the rails 28 and 30 are installed in parallel dispositions communicating longitudinally within spaced furrows of the cargo bed floor 102.

In one practice of a method for installing the cargo bed liner 10, with the rails 28 and 30 disposed atop the floor 102 of the cargo bed 100 and the front wall panel 14 fixed to the front wall 104 of the cargo bed 100, the first floor panel 18 is situated to cause the studs 38 thereof to be slid into a locking position within the corresponding keyhole-shaped apertures in the rails 28 and 30 thereby locking the first floor panel 18 in place. It is within the scope of the invention for the front wall panel 14 to have a locking formation, such as a channel therein, for matingly receiving the anterior edge of the first floor panel 18 thereby to further lock the first panel 18 in place. Then, the second panel 20 is set in place with the anterior edge thereof in juxtaposition with the posterior edge of the first panel 18 and the interlocking tabs 34 of the first panel 18 engaged under the second panel 20. The second panel 20 can then be fixed in place, such as by mechanical fasteners 40 driven through the second panel 20 and into the rails 28 and 30 or by some other method. The third and fourth panels 22 and 24 can be set in place with the anterior edge of the third panel 22 in juxtaposition with the posterior edge of the second panel 20 and the posterior edge of the third panel 22 in juxtaposition with the anterior edge of the fourth panel 24. The third and fourth panels 22 and 24 can be fixedly retained in place by, without limitation, the interlocking tabs 34 of the panels 20, 22, and 24 and the mechanical engagement of the studs 38 that project from the third and fourth panels 22 and 24 with correspondingly located keyhole-shapes slots 36 in the rails 28 and 30. Then, the fifth panel 26 is set in place with the anterior edge thereof in juxtaposition with the posterior edge of the fourth panel 24 and the interlocking tabs 34 of the fourth panel 24 engaged under the fifth panel 26. The fifth panel 26 can then be fixed in place, such as by mechanical fasteners 40 driven through the fifth panel 26 and into the rails 28 and 30 or by some other method. With the combined effects of the interlocking tabs 34, the mechanical fasteners 40, and the aperture and stud combinations 36 and 38, the floor panels 18 through 26 form a rigid, unitary protective platform structure for the floor 102 of the cargo bed 100. The cargo bed liner 12 can be readily removed, such as for repair, replacement, or cleaning of the liner 12 or the cargo bed 100 itself.

The rails 28 and 30 have cross-sectional heights greater than heights of the longitudinal ridges of the floor 102 in relation to the longitudinal furrows of the cargo bed floor 102. With the rails 28 and 30 so constructed and installed, a support surface is provided by the spine of each rail 28 and 30. The support surfaces of the spines of the rails 28 and 30 are disposed in a plane parallel to and spaced by a gap G above the plane of the floor 102 of the cargo bed 100 as formed by the upper surfaces of the longitudinal ridges in the floor 102. By way of an illustrative example and not limitation, it is contemplated within the scope of the invention for the upper surfaces of the spines of the rails 28 and 30 to be spaced at least approximately one-eighth of an inch above the upper surfaces of the ridges of the corrugated floor 102 of the cargo bed 100.

With the gap G, an envelope of space is established between the platform structure formed by the unified interlocking panels 18 through 26, which are fixed to be disposed atop the spines of the rails 28 and 30, and the floor structure 102 of the cargo bed 100 itself. The floor lining structure 12 thus acts as a shell with a superstructure platform physically spaced and separated from the floor 102 of the cargo bed 100. Point load impacts, which would otherwise have the potential to produce permanent damage to the floor 102 of the cargo bed 100, tend to be distributed and deflected across the floor lining structure 12 thereby preventing or minimizing harm to the vehicle.

Embodiments of the cargo bed liner 10 additionally include a cargo management system for enabling the secure and organized retention and transport of cargo within the cargo bed 100. The cargo management system can be considered to be founded on an array of apertures 32 formed through the several interlocking panels 18 through 26, potentially in combination with one or more anchors 42 constructed to engage the apertures 32 in a stable relationship. In the depicted embodiment, the floor panels 18 through 26 have rows of apertures 32 disposed to align longitudinally in series when the floor panels 18 through 26 are disposed in edge-to-edge engagement as shown and described herein. In the current example, the apertures 32 are similarly shaped and sized and have oblong shapes with a longitudinal dimension and a lateral dimension. The longitudinal dimension is greater than the lateral dimension in this embodiment. The apertures 32 may alternatively be referred to as anchor slots or slot apertures 32. It should be understood that the relative dimensions could be reversed or equal, and shapes other than oblong are possible except as the invention might be expressly limited by the claims.

So configured, the apertures 32 provide varied anchoring points for standardized cargo retaining systems, such as bungee cords, ropes, cargo straps, and the like, and for specialized cargo anchors 42 as taught herein. A wide variety of standardized cargo retaining systems will occur to one skilled in the art after reviewing the present disclosure. Apertures 32 within the array of apertures 32 are configured and disposed in relation to one another to facilitate the secure and convenient engagement and retention of cargo retaining systems of the prior art. More particularly, the apertures 32 are disposed to optimize the effective engagement of hook end portions of typical cargo straps, bungee cords, and other retaining systems with end portions incorporating hooks and to facilitate the fastening of other retaining systems including by way of example and not limitation ropes and other tethers and other retaining systems. To promote convenient and effective engagement and retention, at least some apertures 32 within the array of apertures 32 are disposed in pairs with closely spaced edges. For instance, the edges of apertures 32 within pairs of apertures 32 will preferably be spaced at not more than one inch apart and even more preferably not more than 0.55 inches apart. This close spacing of paired apertures 32 has been found to permit ready engagement with hook end portions of prior art bungee cords, cargo straps, and other retaining systems with a distal portion of the hook passed through one aperture 32 of the pair of apertures 32 and then received upwardly through the second aperture of the pair of apertures 32. As seen, for instance, in FIGS. 1, 2, 5, and 6, each of the panels 18, 20, 22, 24, and 26 in the depicted embodiment has rows of paired apertures 32 disposed to align longitudinally with rows of paired apertures 32 of adjacent panels 18 through 26 so that rows of paired apertures 32 are provided over the length of the unified floor lining structure 12 to enable effective and highly variable engagement of cargo retention systems.

The apertures or anchor slots 32 also provide anchoring points for specialized anchors 42 as taught herein. One possible anchor according to the invention is indicated generally at 42 in FIGS. 7 through 10. The anchor 42 could vary in structure and function depending on, among other things, the purpose sought to be achieved, the cargo sought to be retained, the method of retention, and other factors that will occur to one reading this disclosure. By way of example and not limitation, anchors 42 could be used as fixation points for straps or other fasteners, for retention points for dividing members, for foundations for posts and supports for further structures such as shelves and other structures, or for any other purpose where stable support relative to the platform provided by the floor lining structure 12 is required.

In the embodiment of FIGS. 7 through 10, the anchor 42 has a body portion 54. A clamping member 46 is retained by the body portion 54, and a registration member 48, such as a registration pin 48, is retained by the body portion 54 spaced from the clamping member 46. In the depicted embodiment, the clamping member 46 and the registration member 48 are extendably and retractably received through corresponding apertures 76 and 78 in the body portion 54.

The clamping member 46 can be considered to have a longitudinal portion 58 and a lateral portion 60. Here, the lateral portion 60 is generally perpendicular to the longitudinal portion 58. The lateral portion 60 of the clamping member 46 is retained to project away from the registration member 46 as in FIG. 7. The lateral portion 60 and the clamping member 46 in general can be selectively retracted toward the body portion 54. Retraction of the clamping member 46 could be accomplished in multiple ways pursuant to the invention. In the current example, the longitudinal portion 58 of the clamping member 46 is threaded, and a threaded member 50, such as a nut or any other threaded member 50, is rotatably engaged therewith to press against a surface of the body portion 54. Under this construction, the lateral portion 60 of the clamping member 46 can be retracted toward the body portion 54 by a selective rotation of the threaded member 50, and the lateral portion 60 of the clamping member 46 can be permitted to extend in relation to the body portion 54 by a selective, opposite rotation of the threaded member 50.

Figure 9:
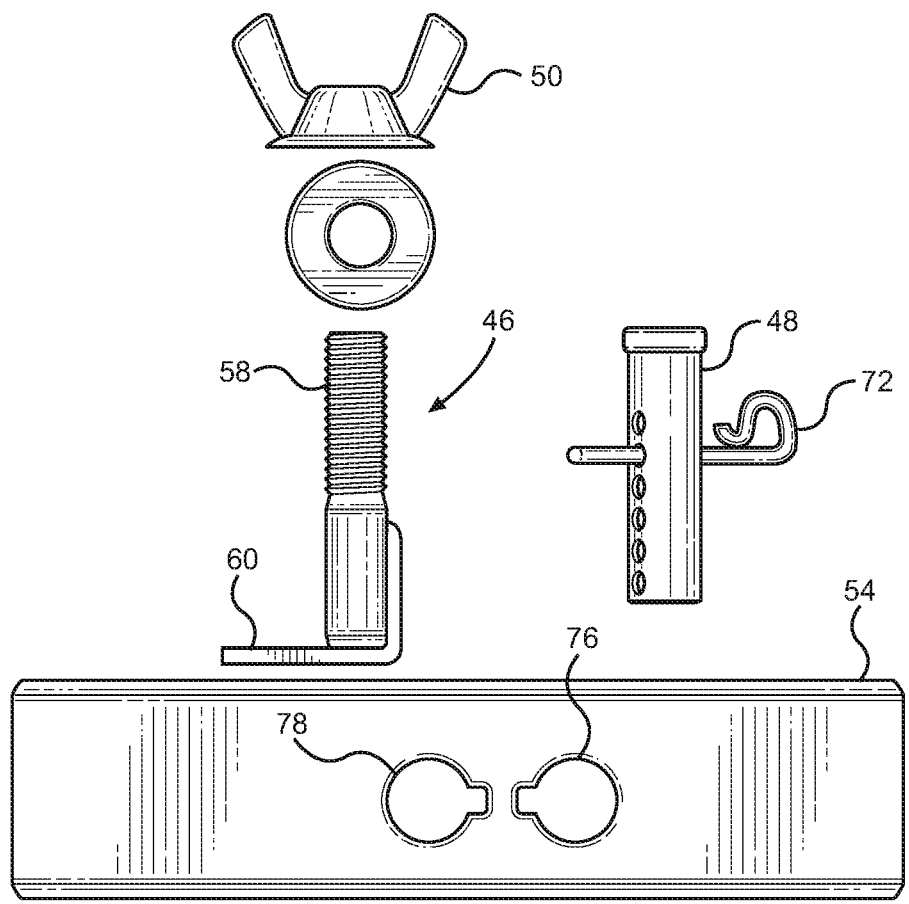
FIG. 9 is an exploded view of the anchor of FIG. 7.
Figure 10:
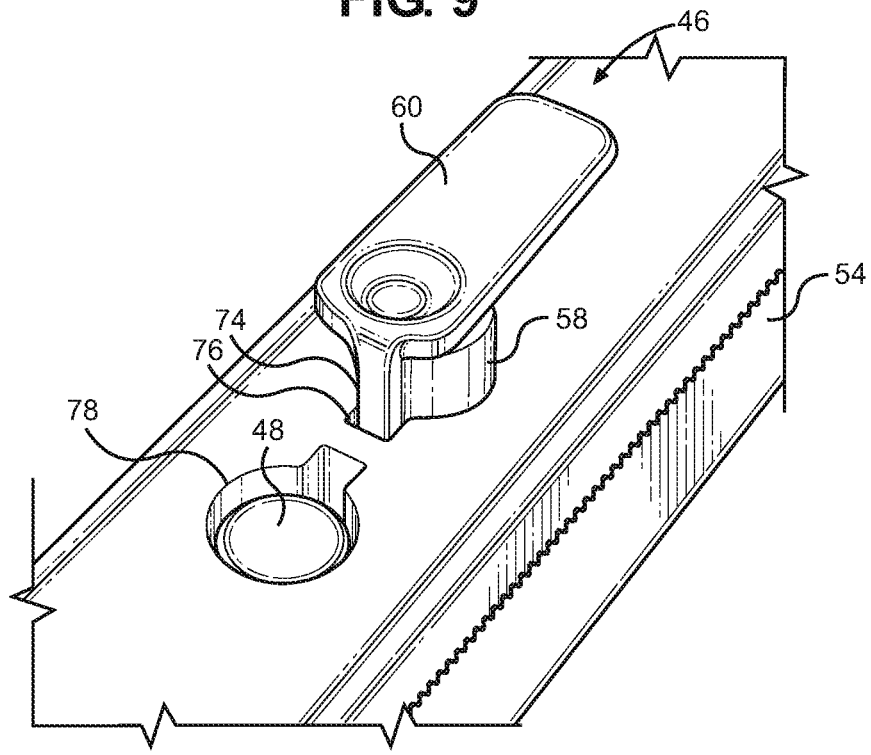
FIG. 10 is an amplified lower perspective view of a portion of the anchor of FIG. 7.

It is contemplated that the clamping member 46 can be fixed against rotation about the longitudinal portion 58. As FIGS. 9 and 10 illustrate, for example, the longitudinal portion 58 of the clamping member 46 can have a key member 76 fixed thereto with a longitudinal orientation aligned with the longitudinal portion 58 of the clamping member 46, and the aperture 76 in the body portion 54 can have a corresponding key slot 74 for slidably receiving the key member 76. With that, the clamping member 46 and the lateral portion 60 thereof are fixed against rotation relative to the body portion 54.

The key member 76 of the clamping member 46 could be formed in a number of ways within the scope of the invention except as it may be expressly limited by the claims. For instance, the key member 76 could be a separate member fixed in place as by welding or the like as is not uncommon to the art. However, in the current embodiment, the key member 76, the longitudinal portion 58, and the lateral portion 60 of the clamping member 46 are uniquely formed and joined. More particularly, the longitudinal portion 58 is formed as a rod or bolt with a threaded end portion, the lateral portion 60 and the key member 76 are integrally formed, and the overall clamping member 46 is efficiently constructed by a joining of the lateral portion 60 and the key member 76 structure with an end portion of the longitudinal portion 58, such as by welding or otherwise. The lateral portion 60 and the key member 76 can, for instance, be crafted from a single piece of metal cut to have a first portion, which can be a broadened, oblong portion, and a second portion, which can be a relatively narrow finger portion. The single piece of metal can then be bent to ninety degrees at approximately the junction between the first and second portions thereby to create the lateral portion 60 in one orientation and the key member 76 perpendicular thereto to form an L shape. The longitudinal member or portion 58 can then be fixed within the L-shape, such as by welding, orbital riveting, or any other effective method, to create the keyed member 76 in a reliable and efficient manner.

Figure 7:
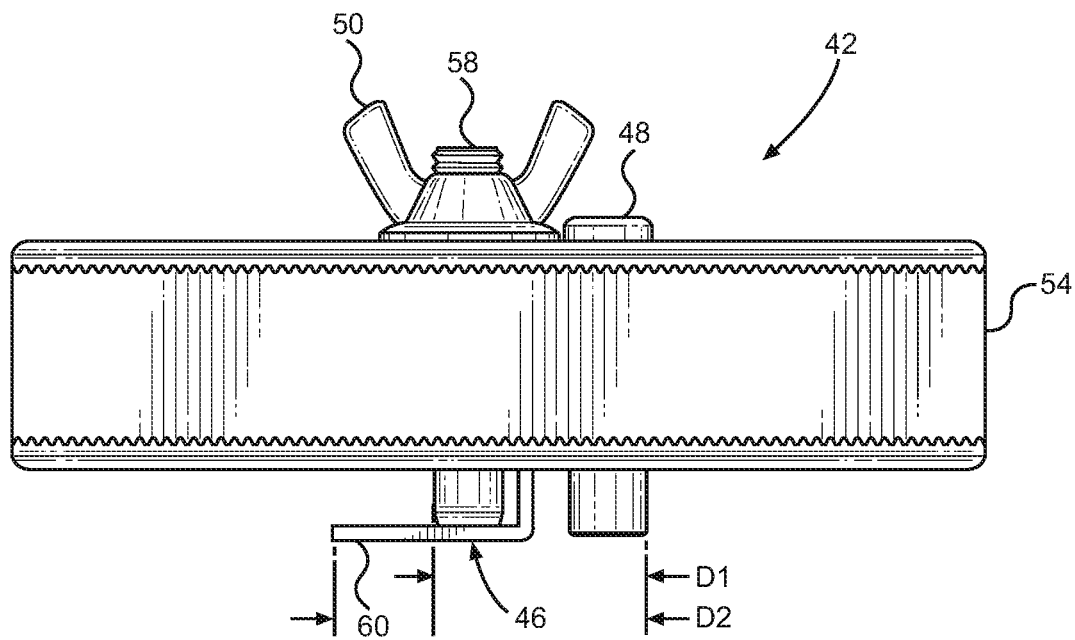
FIG. 7 is a view in front elevation of an anchor according to the present invention with the registration member in an extended position.
Figure 8:
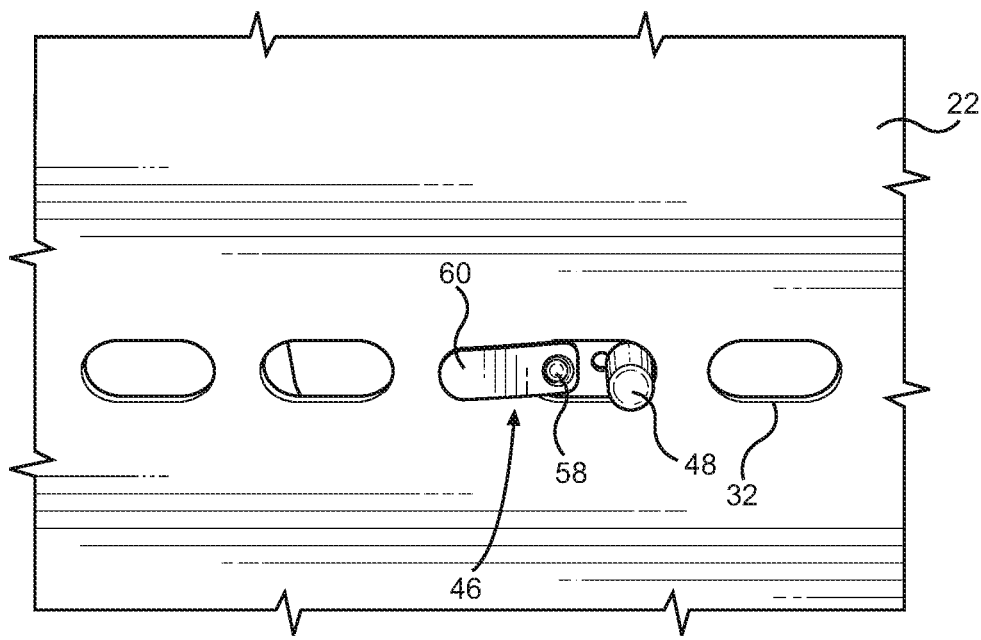
FIG. 8 is a bottom plan view of the anchor of FIG. 7 retained in relation to a floor panel with the registration member in an extended position.

The registration member 48 can be selectively adjusted from a retracted position as shown, for instance, in FIG. 10 to an extended position as shown, for instance, in FIGS. 7 and 8, such as by a sliding of the registration member 48. In certain practices of the invention, the registration member 48 could be biased toward a given position, such as the extended position, by a biasing member (not shown), such as a compression spring. Also in certain practices, the registration member 48 could be selectively fixed in a given position, such as the extended position. For instance, the registration member 48 can be locked in an extended position in the depicted embodiment by operation of a locking pin 72 or any other mechanism.

With further reference to FIG. 7, the registration member 48 and the longitudinal portion 58 of the clamping member 46 have outer surfaces separated by a distance D1 in correspondence to a distance between opposed surfaces of one or more apertures 32 within the arrays of apertures 32 in the floor panels 18 through 26, and the lateral portion 60 of the clamping member 46 projects away from the registration member 48 to extend to a distance D2 greater than the distance D1 and greater than the distance between the opposed surfaces of the one or more apertures 32. The distance between the opposed surfaces of the one or more apertures 32 can be within the same aperture 32 or as between separate apertures 32. By way of example and not limitation, the distance D1 could correspond to the longitudinal dimension of an aperture 32, such as by being marginally less than the length of the aperture 32, and the distance D2 could be dimensionally greater than the length of the aperture 32. The lateral portion 60 can, in certain embodiments, generally correspond in oblong shape to oblong-shaped apertures 32 while being smaller in size to permit the lateral portion 60 to be received through the aperture 32.

In certain practices of the invention, the distance D1 can be at least approximately eighty percent of the length of a slot aperture 32 in the panels 18 through 26, and the lateral portion 60 of the clamping member 46 has a length less than the length of the slot aperture 32 to facilitate insertion and removal of the lateral portion 60 through the slot 32. In such embodiments, once the clamping member 46 and the registration member 48 are inserted into the slot, the anchor 42 can move not more than twenty percent of the length of the slot 32 to facilitate secure retention of the anchor 42. Clamping of the clamping member 46 by rotation of the threaded member 50 further secures the anchor 42. Disengagement of the anchor 42 can be readily accomplished by loosening the threaded member 50 to permit the clamping member 46 to extend, retracting the registration member 48, and withdrawing the lateral portion 60 of the clamping member 46 from the slot 32.

Under the foregoing construction, the anchor 42 can be installed and fixed in relation to an aperture 32 within the array of apertures in the panels 18 through 26. To do so, the registration member 48 can be disposed in a retracted position. Then, the lateral portion 60 of the clamping member 46 can be inserted through the aperture 32. The anchor 42 can then be slid in the direction of the lateral portion 60 to a position where the registration member 48 can be received into the aperture 32 and so that the lateral portion 60 underlies the portion of the panel 18, 20, 22, 24, or 26 adjacent to the aperture 32. With the registration member 48 extended, the anchor 42 is fixed in position in relation to the aperture 32. The anchor 42 can be further fixed in position by a selective rotation of the threaded member 50 to retract the lateral portion 60 of the clamping member 46 into clamping engagement with the respective panel 18, 20, 22, 24, or 26. So retained, the anchor 42 can serve as a secure retention location for cargo securing, partitioning, supporting, or other retention functionality. When the anchor 42 is to be removed, the process can be reversed as by an opposition rotation of the threaded member 50, a retraction of the registration member 48, a reverse sliding of the anchor 42, and a withdrawal of the lateral portion 60 from the aperture 32.

Figure 11:
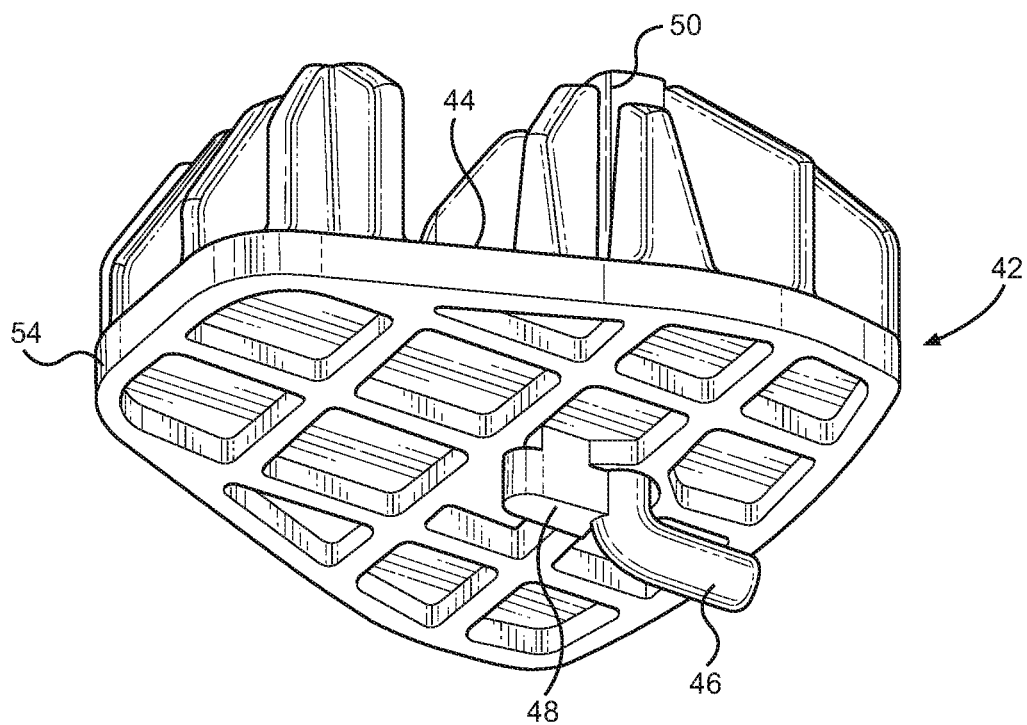
FIG. 11 is a lower perspective view of an alternative anchor of the cargo bed liner as taught herein.

Again, the anchor 42 can pursue varied embodiments depending on the function sought to be achieved. For instance, another anchor 42 is depicted in FIG. 11. There, the anchor 42 again has a body portion 54. A clamping member 46 again with a lateral portion and a longitudinal portion can be selectively retracted by operation of a threaded member 50, and a registration member 48 can fixedly or retractably extend from the body portion 54 opposite to the lateral portion of the clamping member 46 with respect to the longitudinal portion 58 of the clamping member 46. A selective clamping operation can be undertaken similar to that described above. Here, however, the body portion 54 of the anchor 42 has a lateral slot 44 therein that can be used, for instance, to receive and retain a frame member or cargo itself (not shown in FIG. 11). For example, a frame member retained by the anchor 42 might be used to subdivide the cargo bed 100, or any one of numerous other functions could be realized.

Figure 12:
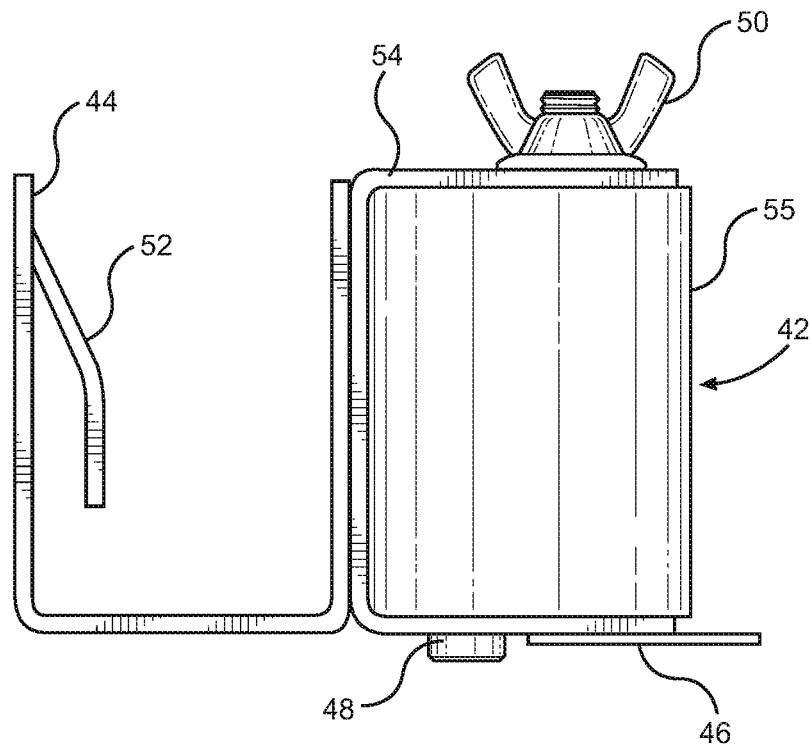
FIG. 12 is a view in front elevation of another alternative anchor pursuant to the invention.
Figure 13:
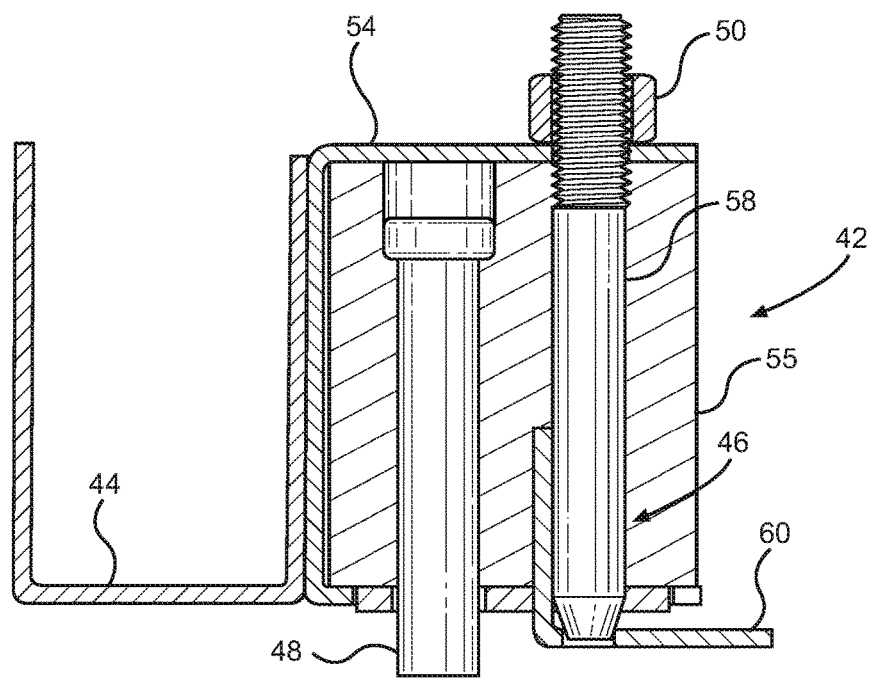
FIG. 13 is a sectioned view in front elevation of the anchor of FIG. 12.
Figure 14:
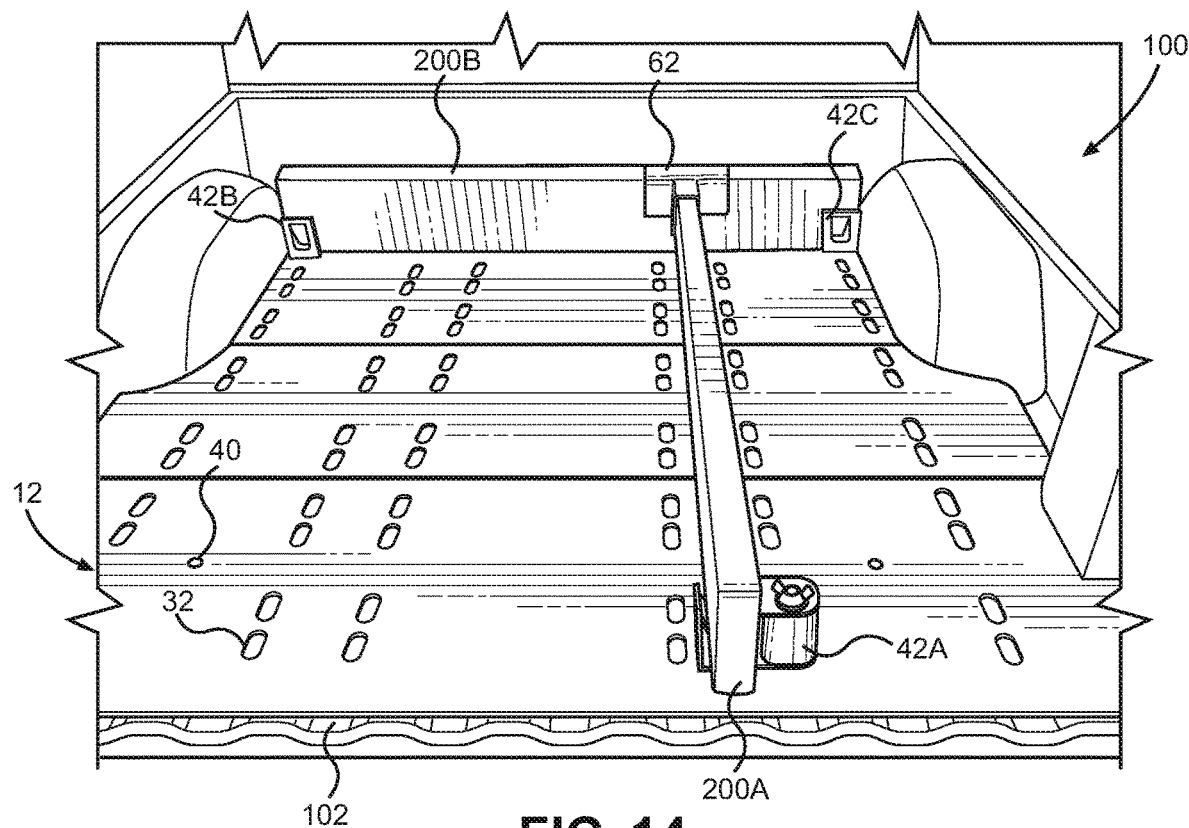
FIG. 14 is a perspective view of plural dividers retained by anchors as in FIG. 12.

A further manifestation of the anchor 42 is depicted in FIGS. 12 through 14. The anchor 42 is founded on a body portion 54. A clamping member 46 with a lateral portion 60 and a longitudinal portion 58 can be selectively retracted by operation of a threaded member 50. A registration member 48 retractably extends from the anchor 42 to the opposite side of the longitudinal portion 58 of the clamping member 46. The anchor 42 can be clamped in relation to a given panel 18, 20, 22, 24, or 26 as described hereinabove. In the present embodiment, however, the body portion 54 can be selectively pivoted in relation to the clamping member 46 and the registration member 48. For instance, the clamping member 46 and the registration member 48 can be extendably and retractably retained by a pivot member 55, and the body portion 54 can be selectively pivotable relative to the pivot member 55. The body portion 54 in this embodiment has an annular channel therein along which the registration member 48 can travel to permit relative rotation between the body portion 54 and the pivot member 55. The body portion 54 of the anchor 42 again has a lateral slot 44 therein, and a locking tooth 52 is disposed in the slot 44 to assist in fixing a frame member in place relative to the anchor 42 and in relation to the cargo bed liner 12 in general.

Under such constructions, one or more frame members 200A, 200B, 200n can be securely retained in relation to the cargo bed 100 by appropriately disposed, oriented, and retained anchors 42A, 42B, 42C, 42n. As in FIG. 14, for instance, a first anchor 42A is fixed to a central portion of the fifth panel 26 with a slot in a longitudinal orientation relative to the cargo bed 100, and second and third anchors 42B and 42C are fixed to outer portions of the first panel 18 with slots in a lateral orientation relative to the cargo bed 100, and a T-joint 62 is disposed at a junction between the anchors 42A, 42B, and 42C. With that, the cargo bed 100 is divided into subcompartments by the frame members 200A and 200B to assist in cargo retention, transport, or organization.

With certain details and embodiments of the present invention for a vehicle bed liner and cargo management system disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims shall define the scope of protection to be afforded to the inventors. Those claims shall be deemed to include equivalent constructions insofar as they do not depart from the spirit and scope of the invention. It must be further noted that a plurality of the following claims may express, or be interpreted to express, certain elements as means for performing a specific function, at times without the recital of structure or material. As the law demands, any such claims shall be construed to cover not only the corresponding structure and material expressly described in this specification but also all equivalents thereof.

What is claimed as deserving the protection of Letters Patent:

1. A cargo bed liner for protecting a cargo bed of a vehicle, the cargo bed liner comprising:
   a cargo liner platform comprising plural rigid floor panels for being disposed in substantially coplanar juxtaposition to form the cargo liner platform wherein each rigid floor panel has an upper surface, a lower surface, an anterior edge, a posterior edge, and left and right side edges;
   at least one suspension rail for being longitudinally disposed within the cargo bed of the vehicle to retain and suspend the rigid floor panels above the cargo bed of the vehicle with a gap between the rigid floor panels and the cargo bed of the vehicle whereby impacts on at least one of the rigid floor panels tend to be dispersed over the at least one of the rigid floor panels; and an array of apertures in the cargo liner platform to enable cargo retention in relation to the cargo liner platform and the cargo bed of the vehicle.

2. The cargo bed liner of claim 1 wherein there are at least two suspension rails for being disposed in a parallel, longitudinally disposed relationship within the cargo bed of the vehicle.

3. The cargo bed liner of claim 1 wherein at least one of the plural rigid floor panels has at least one interlocking tab that projects beyond at least one of the anterior edge and the posterior edge of the rigid floor panel.

4. The cargo bed liner of claim 3 wherein there are at least three rigid floor panels and wherein a middle panel of the at least three rigid floor panels has plural interlocking tabs that project from the anterior edge of the panel and plural interlocking tabs that project from the posterior edge of the panel.

5. The cargo bed liner of claim 2 wherein at least one of the rigid floor panels has plural locking slots or plural locking studs and wherein the at least one rail has plural locking studs or plural locking slots disposed to engage the plural locking slots or plural locking studs of the at least one of the rigid floor panels.

6. The cargo bed liner of claim 5 wherein the plural locking slots comprise keyhole-shaped locking slots.

7. The cargo bed liner of claim 5 wherein at least one of the plural rigid floor panels has at least one interlocking tab that projects beyond at least one of the anterior edge and the posterior edge of the rigid floor panel.

8. The cargo bed liner of claim 7 wherein there are at least three rigid floor panels and wherein a middle panel of the at least three rigid floor panels has plural interlocking tabs that project from the anterior edge of the panel and plural interlocking tabs that project from the posterior edge of the panel whereby the plural interlocking tabs and the plural locking slots and locking studs combine to retain the plural rigid floor panels in a rigid protective structure.

9. The cargo bed liner of claim 8 wherein there are at least five rigid floor panels with at least one rigid floor panel with plural interlocking tabs that project from at least one of the anterior and posterior edges of the panel, at least one rigid floor panel with plural locking studs that project from the lower surface thereof, and at least one rigid floor panel for being affixed to the suspension rails by mechanical fasteners.

10. A cargo bed liner for protecting a cargo bed of a vehicle, the cargo bed liner comprising:
a cargo liner platform comprising at least one rigid floor panel with an upper surface, a lower surface, an anterior edge, a posterior edge, and left and right side edges;
at least one suspension rail for being longitudinally disposed within the cargo bed of the vehicle to retain and suspend the at least one rigid floor panel above the cargo bed of the vehicle with a gap between the at least one rigid floor panel and the cargo bed of the vehicle whereby impacts on the at least one rigid floor panel tend to be dispersed over the at least one rigid floor panel; and
an array of apertures in the cargo liner platform to enable cargo retention in relation to the cargo liner platform and the cargo bed of the vehicle;
wherein the cargo bed has longitudinal ridges separated by longitudinal furrows, wherein the longitudinal ridges have a height and wherein the at least one rail has a height greater than the height of the longitudinal ridges.

11. The cargo bed liner of claim 10 further comprising a vehicle with a cargo bed with longitudinal ridges separated by longitudinal furrows.

12. The cargo bed liner of claim 10 wherein the at least one rigid floor panel has at least one aperture therein, the at least one aperture with a longitudinal dimension and a lateral dimension, and further comprising an anchor for being selectively retained relative to the at least one aperture.

13. A cargo bed liner for protecting a cargo bed of a vehicle, the cargo bed liner comprising:
a cargo liner platform comprising at least one rigid floor panel with an upper surface, a lower surface, an anterior edge, a posterior edge, and left and right side edges;
at least one suspension rail for being longitudinally disposed within the cargo bed of the vehicle to retain and suspend the at least one rigid floor panel above the cargo bed of the vehicle with a gap between the at least one rigid floor panel and the cargo bed of the vehicle whereby impacts on the at least one rigid floor panel tend to be dispersed over the at least one rigid floor panel;
an array of apertures in the cargo liner platform to enable cargo retention in relation to the cargo liner platform and the cargo bed of the vehicle wherein the at least one rigid floor panel has at least one aperture therein, the at least one aperture with a longitudinal dimension and a lateral dimension; and
an anchor for being selectively retained relative to the at least one aperture wherein the anchor has a body portion, a clamping member that is extendable and retractable relative to the body portion, and a registration member retained by the body portion spaced from the clamping member.

14. The cargo bed liner of claim 13 wherein the clamping member and the registration member have outer surfaces separated by a distance less than the longitudinal dimension of the at least one aperture.

15. The cargo bed liner of claim 13 wherein the registration member is extendable and retractable relative to the body portion.

16. The cargo bed liner of claim 13 wherein apertures within the array of apertures are spaced with edges separated by not more than one approximately inch.

17. The cargo bed liner of claim 16 wherein apertures within the array of apertures are spaced with edges separated by not more than approximately 0.55 inches.

18. The cargo bed liner of claim 13 wherein apertures within the array of apertures are disposed in aperture pairs over in the cargo liner platform.

19. The cargo bed liner of claim 18 wherein apertures within aperture pairs are spaced with edges separated by not more than approximately one inch.

20. A cargo bed liner and cargo management system, the cargo bed liner comprising:
a cargo liner platform comprising at least one rigid floor panel with an upper surface, a lower surface, an anterior edge, a posterior edge, and left and right side edges;
at least one aperture in the at least one rigid floor panel, the at least one aperture with a longitudinal dimension and a lateral dimension; and
an anchor for being selectively retained relative to the at least one aperture wherein the anchor has a body portion, a clamping member that is extendable and retractable relative to the body portion, and a registration member retained by the body portion spaced from the clamping member.

21. The cargo bed liner of claim 20 wherein the clamping member and the registration member have outer surfaces separated by a distance less than the longitudinal dimension of the at least one aperture.

22. The cargo bed liner of claim 21 wherein the longitudinal dimension of the at least one aperture is greater than the lateral dimension of the at least one aperture.

23. The cargo bed liner of claim 22 wherein the clamping member and the registration member have outer surfaces separated by a distance that is at least approximately eighty percent of the longitudinal dimension of the at least one aperture.

24. The cargo bed liner of claim 20 wherein the registration member is extendable and retractable relative to the body portion.

25. The cargo bed liner of claim 20 wherein the clamping member has a longitudinal portion and a lateral portion, the lateral portion retained to project away from the registration member.

26. The cargo bed liner of claim 25 wherein the longitudinal portion of the clamping member is threaded and further comprising a threaded member threadedly engaged with the longitudinal portion for selectively retracting the lateral portion by rotation of the threaded member.

27. The cargo bed liner of claim 25 wherein the longitudinal portion of the clamping member is keyed in relation to the body portion to prevent rotation of the clamping member relative to the body portion.

28. The cargo bed liner of claim 20 further comprising a lateral slot in the body portion of the anchor.

29. The cargo bed liner of claim 28 wherein at least a portion of the body portion of the anchor is pivotable in relation to at least one of the clamping member and the registration member.

30. The cargo bed liner of claim 20 wherein the cargo liner platform is formed by plural rigid floor panels for being disposed in substantially coplanar juxtaposition to form the cargo liner platform and wherein an array of apertures is disposed in at least one of the plural rigid floor panels.

31. The cargo bed liner of claim 20 wherein apertures within the array of apertures are disposed in aperture pairs over in the cargo liner platform.

32. The cargo bed liner of claim 31 wherein apertures within aperture pairs are spaced with edges separated by not more than approximately one inch.

33. A cargo bed liner for protecting a cargo bed of a vehicle, the cargo bed liner comprising:
a cargo liner platform formed by plural rigid floor panels wherein each rigid floor panel has an upper surface, a lower surface, an anterior edge, a posterior edge, and left and right side edges;
at least first and second rails for being longitudinally disposed within the cargo bed of the vehicle to retain the cargo liner platform whereby impacts on the cargo liner platform tend to be dispersed over the cargo liner platform;
at least one interlocking tab that projects beyond at least one of the anterior edge and the posterior edge of at least one of the rigid floor panels.

34. The cargo bed liner of claim 33 wherein there are at least three rigid floor panels and wherein a middle panel of the at least three rigid floor panels has plural interlocking tabs that project from the anterior edge of the panel and plural interlocking tabs that project from the posterior edge of the panel.

35. The cargo bed liner of claim 33 wherein at least one of the rigid floor panels has plural locking slots or plural locking studs and wherein each of the first and second rails has at least one locking stud or at least one locking slot disposed to engage a locking slot or locking stud of the at least one of the rigid floor panels.

* * * * *